United States Patent
Wu et al.

(10) Patent No.: US 7,333,453 B2
(45) Date of Patent: Feb. 19, 2008

(54) SYSTEM AND METHOD FOR SUPPORTING INTER-NAT-DOMAIN HANDOFF IN A VPN BY ASSOCIATING L2TP AND MOBILE IP

(75) Inventors: Ko-Ching Wu, Taipei (TW); Da-Jiun Chou, Taipei (TW); Jung-Hsuan Fan, Taipei (TW); Jen-Shun Yang, Sinjhuang (TW); Chien-Chao Tseng, Hsinchu (TW)

(73) Assignee: Industrial Technology Research Institute, Chutung, Hsinchu (TW)

( * ) Notice: Subject to any disclaimer, the term of this patent is extended or adjusted under 35 U.S.C. 154(b) by 715 days.

(21) Appl. No.: 10/832,449

(22) Filed: Apr. 27, 2004

(65) Prior Publication Data

US 2005/0128979 A1    Jun. 16, 2005

(30) Foreign Application Priority Data

Dec. 15, 2003    (TW) ............................. 92135399 A

(51) Int. Cl.
*H04Q 7/00* (2006.01)
(52) U.S. Cl. .................. 370/331; 370/338; 370/401; 455/436
(58) Field of Classification Search ............ 370/230.1, 370/331, 392; 455/436; 713/153; 726/11, 726/12, 14, 15
See application file for complete search history.

(56) References Cited

U.S. PATENT DOCUMENTS 6,452,920 B1    9/2002    Comstock

2003/0224788 A1* 12/2003 Leung et al. ............ 455/435.1
2004/0078600 A1*  4/2004 Nilsen et al. ................ 713/201
2004/0266420 A1* 12/2004 Malinen et al. ............. 455/421
2006/0185012 A1*  8/2006 Olivereau et al. ............ 726/14

OTHER PUBLICATIONS

Gleeson et al.; "A Framework for IP Based Virtual Private Networks"; Feb. 2000; Internet Engineering Task Force (IEFT); RFC 2764; pp. 1-62.*
F. Adrangi et. al.; *Problem Statement: Mobile IPv4 Traversal of VPN Gateways*; Jan. 2003; Internet Engineering Task Force (IETF); pp. 1-20.
H. Levkowetz et. al.; *Mobile IP Traversal of Network Address Translation (NAT) Devices*; Apr. 2003; The Internet Society; pp. 1-34.
W. Townsley et. al.; *Layer Two Tunneling Protocol "L2TP"*; Aug. 1999; The Internet Society; pp. 1-80.

* cited by examiner

*Primary Examiner*—Rafael Perez-Gutierrez
*Assistant Examiner*—Abdias Mondesir
(74) *Attorney, Agent, or Firm*—Bacon & Thomas, PLLC

(57) ABSTRACT

The present invention relates to a system and method for supporting inter-NAT-domain handoff in a VPN by associating L2TP and mobile IP. A mobile node is able to roam from an Intranet to a foreign network, and implement a VPN by L2TP. The Intranet has a VPN gateway and a home agent corresponding to the mobile node. The foreign network has a NAT gateway. An L2TP (PPP) tunnel passing the NAT gateway is established between the mobile node in the foreign network and the VPN gateway. The L2TP (PPP) tunnel has a first terminal on the VPN gateway, with an address set to the home agent's IP address, and a second terminal on the mobile node, with an address set to the mobile node's CoA.

3 Claims, 4 Drawing Sheets

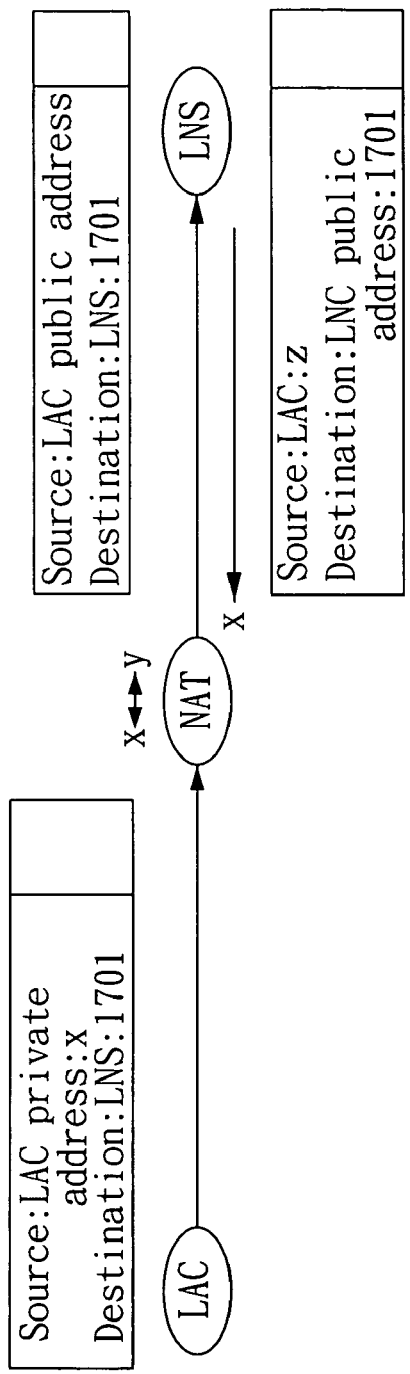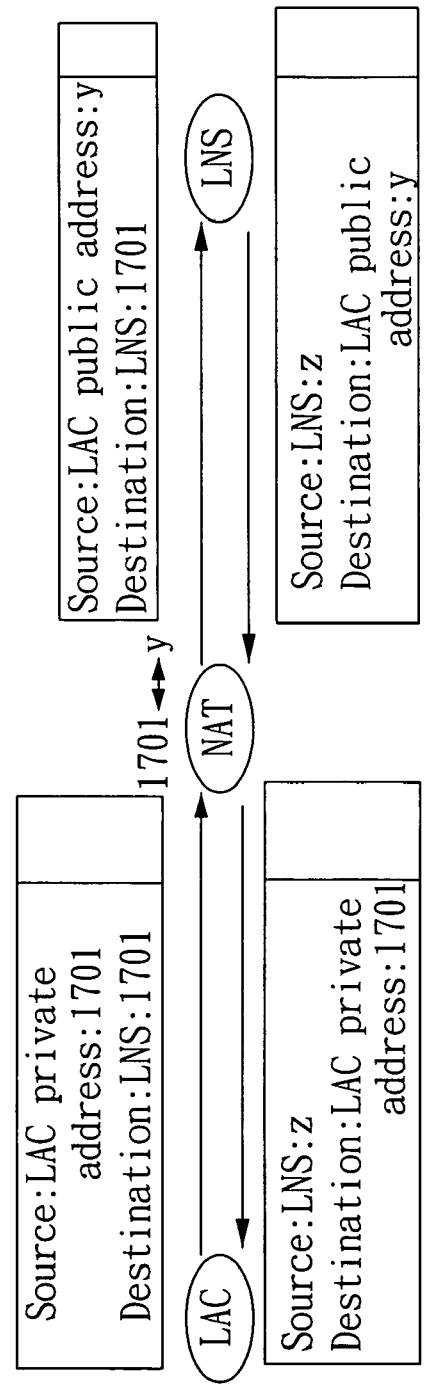
FIG. 3A
FIG. 3B

SYSTEM AND METHOD FOR SUPPORTING INTER-NAT-DOMAIN HANDOFF IN A VPN BY ASSOCIATING L2TP AND MOBILE IP

BACKGROUND OF THE INVENTION

1. Field of the Invention

The present invention relates to a system and method for supporting inter-NAT-domain (inter network address translation domain) handoff in a VPN (virtual private network) by associating L2TP (layer 2 tunneling protocol) and mobile IP (internet protocol), which can support connective handoff over NAT gateway in a VPN.

2. Description of Related Art

In recent years, mobile communication systems tend to apply mobile IP for integrating various accessing media, such as wireless LAN, GPRS, WCDMA/cdma2000 and the like. However, for further securing various accessing media used by the users, it needs a security mechanism to protect the right of accessing a network. VPN applications also tend to access a home network, namely, Intranet sources, via a multi-tier network structure at anytime. For this requirement, it is desired to associate mobile IP and VPN to provide a user with secure and connective handoff.

SUMMARY OF THE INVENTION

The object of the present invention is to provide a system and method for supporting inter-NAT-domain handoff in a VPN by associating L2TP and mobile IP, which can package mobile IP into L2TP to thus integrate mobile IP and VPN, thereby providing session mobility and security. Also, the system and method provides a user with secure and connective handoff service.

In accordance with one aspect of the invention, a system for supporting inter-NAT-domain handoff in a VPN by associating L2TP and Mobile IP is provided. The system includes at least one mobile node, an Intranet and a foreign network. The mobile node can roam from an Intranet to a foreign network, and achieve a VPN by L2TP. The Intranet has a VPN gateway and a home agent corresponding to the mobile node. The foreign network has a NAT gateway. An L2TP (PPP) tunnel passing the NAT gateway is established between the mobile node in the foreign network and the VPN gateway. The VPN is formed by connecting the mobile node, NAT gateway and VPN gateway in series via the L2TP (PPP) tunnel. The L2TP (PPP) tunnel has a first terminal on the VPN gateway, with an address set to the home agent's IP address, and a second terminal close to the mobile node, with an address set to the mobile node's CoA.

In accordance with another aspect of the present invention, a method for supporting inter-NAT-domain handoff in a VPN by associating L2TP and Mobile IP is provided. The method includes: using a mobile node in a foreign network to add an MIP header to an original packet to be delivered to an Intranet, such that an MIP packet is generated to trigger the L2TP when it enters into the L2TP (PPP) tunnel; using the mobile node to add an L2TP header to the MIP packet for generating an L2TP packet and next sending it out of the mobile node, wherein the L2TP header has a source port limited to port '1701'; using the NAT gateway to translate the L2TP packet; using the VPN gateway to un-package the L2TP header of the L2TP packet translated for generating the MIP packet, record a source port in the MIP packet and forward the MIP packet to a home agent after being recorded; and using the home agent to un-package the MIP header of the MIP packet for generating the original packet and next forward the original packet to a correspondent node according to a destination address of the original packet.

Other objects, advantages, and novel features of the invention will become more apparent from the following detailed description when taken in conjunction with the accompanying drawings.

BRIEF DESCRIPTION OF THE DRAWINGS

FIG. 3A shows the problem occurred when an L2TP (PPP) is applied and a packet is passed through a NAT gateway;

FIG. 3B shows solution for FIG. 3A according to the invention; and

DETAILED DESCRIPTION OF THE PREFERRED EMBODIMENT

Figure 1:
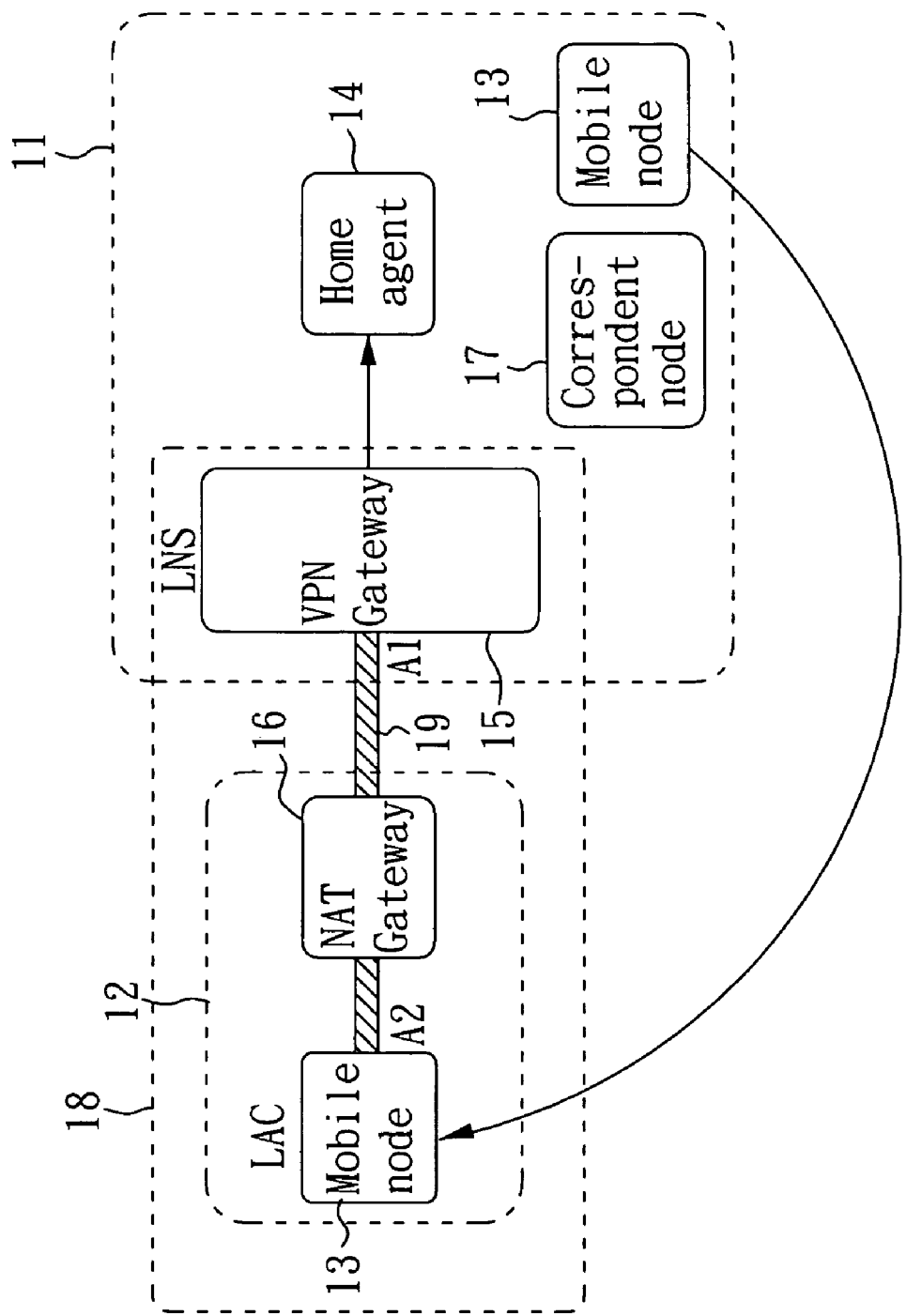
FIG. 1 is a functional block diagram of a system achitecture according to the invention.

FIG. 1 is a system configuration in accordance with the inventive system and method for supporting inter-NAT-domain handoff in a VPN by associating L2TP and mobile IP. As shown in FIG. 1, a mobile node 13 roams from a home address of an Intranet 11 to a foreign network 12. Upon Mobile IP standard, the mobile node 13 in the Intranet 11 corresponds to a home agent 14 and also, upon L2TP standard, a VPN gateway 15 in the Intranet 11 is regarded as an L2TP network server (LNS) while the mobile node 13 in the foreign network 12 is regarded as an L2TP access concentrator (LAC). An L2TP (or Point-to-Point Protocol, abbreviated as PPP) tunnel 19 passing a NAT gateway 16 in the foreign network 12 is established between the mobile node (LAC) 13 and the VPN gateway (LNS) 15. The VPN 18 is formed by connecting the mobile node, NAT gateway and VPN gateway in series via the L2TP (PPP) tunnel 19. The L2TP (PPP) tunnel 19 has a first terminal on the VPN gateway (LNS) 15, with an address A1 set to IP address of the home agent 14, and a second terminal on the mobile node (LAC) 13, with an address A2 set to the care of address (CoA) of the mobile node.

Figure 2:
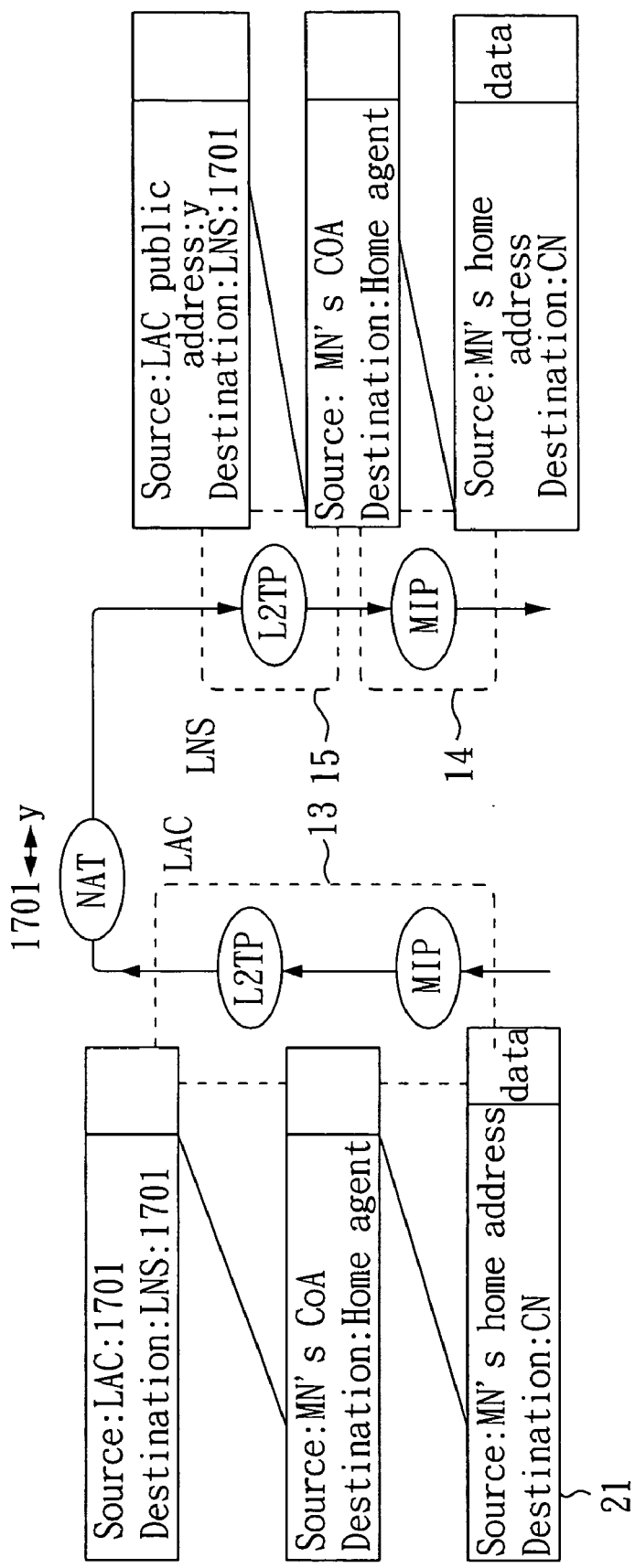
FIG. 2 shows a packet flow from a mobile node to a correspondent node according to the invention.

FIG. 2 shows a packet flow from the mobile node 13 to a correspondent node 17. Referring to FIG. 1 and FIG. 2, when the mobile node 13 in the foreign network 12 desires to deliver a packet 21 to a correspondent node (CN) 17 in the Intranet 11, the packet 21 to be delivered from the mobile node 13 to the CN 17 (i.e., source: MN home address and destination: CN) is packaged firstly by MIP in the mobile node 13 to thus add an MIP header (with source: NM's CoA, and destination: home agent). Since the L2TP (PPP) tunnel 19 established sets an endpoint address A1 on the VPN gateway (LNS) 15 to an IP address of the home agent 14, a packet with the MIP header (MIP packet) sent by the mobile node 13 to the home agent 14 is delivered into the L2TP (PPP) tunnel 19 for starting L2TP. Thus, L2TP in the mobile node 13 packages the packet by adding an L2TP header (with source: LAC and destination: LNS), so as to generate a packet with the L2TP header (L2TP packet) to output from the mobile node 13.

Upon L2TP standard, LNS and LAC will listen and receive packets at UDP port '1701', so that the destination of leading UDP header is limited to port '1701' when LNS and LAC send packets. However, this can cause problem when the NAT gateway 16 performs an address translation, as shown in FIG. 3A. Namely, when a packet is sent from LAC to LNS (i.e., source: LAC private address at port 'x', and destination: LNS at port '1701') is translated by NAT into a packet (with source: LAC public address at port 'y', and destination: LNS at port '1701'), NAT records only a relation of ports 'x' and 'y'. However, when the packet is sent from LNS to LAC (i.e., source: LNS at port 'z', and destination: LAC public address at port '1701'), it accordingly has only the relation of ports 'x' and 'y', without recording port 1701 so that the packet cannot be accepted by the NAT gateway 16. To overcome this, the invention limits the source port of L2TP header of the packet sent by LAC to port '1701'. As shown in FIG. 3B, the packet sent from LAC to LNS (i.e., source: LAC private address at port '1701' and destination: LNS at port '1701') is processed by NAT to generate translated packet (with source: LAC public address at port 'y' and destination: LNS at port '1701'), wherein NAT records the relation of port '1701' and 'y'. In addition, LNS records the source port (translated by NAT, i.e., port 'y') sent by LAC, thereby sending the packet to the source port 'y', instead of port '1701'. Therefore, when LNS sends the packet to LAC (source: LNS at port 'z' and destination: LAC public address at port 'y'), since NAT records the relation of ports '1701' and 'y', NAT can receive the packet and send it to port '1701', thereby properly sending back the packet.

Referring again to FIGS. 1 and 2, the packet is sent by the mobile node 13 to the VPN gateway 15 through the L2TP (PPP) tunnel 19 and the NAT. The VPN gateway 15 un-packages the L2TP header of the packet to obtain the MIP packet and then sends the MIP packet to the home agent 14. The home agent 14 finds that the CoA of the mobile node 13 is located at the far-end of the L2TP (PPP) tunnel 19 and thus sends the packet 21 to the correspondent node 17 according to the destination address of the packet 21 obtained after un-packaging the MIP header.

Figure 4:
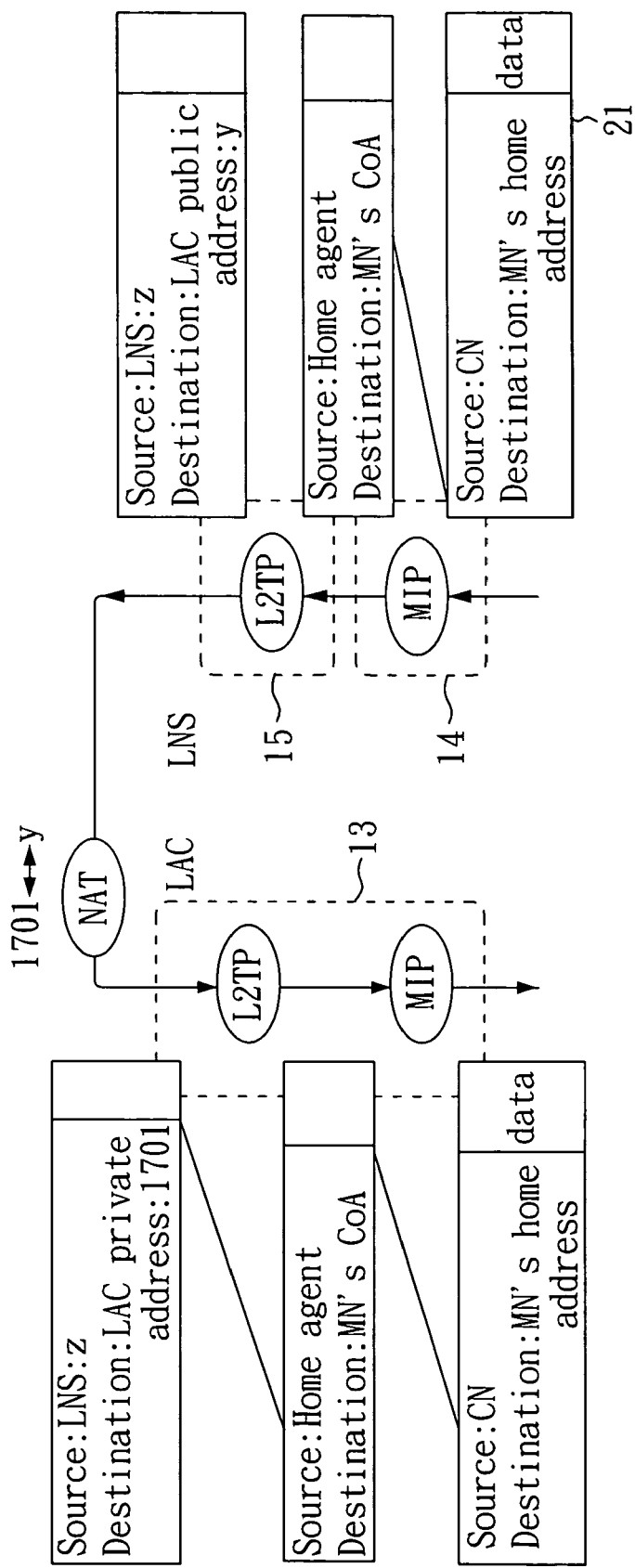
FIG. 4 shows a packet flow from a correspondent node to a mobile node.

FIG. 4 shows a packet flow from the correspondent node 17 to the mobile node 13. Firstly, MIP in the home agent 14 adds an MIP header (with source: home agent, and destination: NM's CoA) to the packet 21 sent by correspondent node (CN) 17 to the mobile node 13 (i.e., source: CN, and destination: MN home address). Since the L2TP (PPP) tunnel 19 established sets CoA of the mobile node 13 to another endpoint address A2 close to the mobile node, a packet with the MIP header (MIP packet) sent by the correspondent node 17 to the home agent 14 is delivered into the L2TP (PPP) tunnel 19 for starting L2TP. Thus, L2TP in the VPN gateway 15 packages the MIP packet by adding an L2TP header (with source: LNS and destination: LAC public address), so as to generate a packet with the L2TP header (L2TP packet) to next output to the mobile node 13 through the L2TP (PPP) tunnel 19 and the cited NAT. The mobile node 13 un-packages the two headers (i.e., L2TP header (with source: LNS and destination: LAC private address) and MIP header (with source: home agent and destination: MN's CoA) to thus obtain the original packet 21.

In view of the foregoing, it is appreciated that the invention associates mobile IP and VPN by packaging the mobile IP into L2TP, thereby providing both transmission mobility and security.

Although the present invention has been explained in relation to its preferred embodiment, it is to be understood that many other possible modifications and variations can be made without departing from the spirit and scope of the invention as hereinafter claimed.

What is claimed is:

1. A method for supporting inter-NAT-domain handoff in a VPN by associating L2TP and mobile IP, which allows a mobile node to roam from an Intranet to a foreign network and implement a VPN by L2TP, wherein the Intranet has a VPN gateway and a home agent corresponding to the mobile node, the foreign network has a NAT gateway, an L2TP (PPP) tunnel passing the NAT gateway is established between the mobile node in the foreign network and the VPN gateway, and the VPN is formed by connecting the mobile node, NAT gateway and VPN gateway in series via the L2TP (PPP) tunnel, the method comprising the steps of:

using the mobile node in the foreign network to add an MIP header to an original packet to be delivered to the Intranet, such that an MIP packet is generated to start the L2TP when it enters into the L2TP (PPP) tunnel;

using the mobile node to add an L2TP header to the MIP packet for generating an L2TP packet and next sending the L2TP packet out of the mobile node, wherein the L2TP header has a source port limited to port '1701';

using the NAT gateway to translate the L2TP packet;

using the VPN gateway to un-package the L2TP header of the L2TP packet translated for generating the MIP packet, record a source port in the L2TP header and forward the MIP packet to a home agent after being recorded; and using the home agent to un-package the MIP header of the MIP packet for generating the original packet and next forward the original packet to a correspondent node according to a destination address of the original packet.

2. The method as claimed in claim 1, further comprising the steps of:

using the home agent to add a MIP header to the original packet sent from the correspondent node to the mobile node in the foreign network for generating a MIP packet, wherein the L2TP is triggered when the packet enters into the L2TP (PPP) tunnel;

using the VPN gateway to add a L2TP header to the MIP packet for generating a L2TP packet and next send the L2TP packet out of the Intranet, wherein the VPN gateway uses the source port recorded in the VPN gateway as a destination port of the L2TP header;

using the NAT gateway to translate the L2TP packet; and using the mobile node in the foreign network to un-package the L2TP header and MIP header of the translated packet.

3. The method as claimed in claim 1, wherein the L2TP (PPP) tunnel has a first terminal on the VPN gateway, with an address set to the home agent's IP address, and a second terminal on the mobile node, with an address set to the mobile node's CoA.

* * * * *